US008899273B2

(12) United States Patent
Willis

(10) Patent No.: US 8,899,273 B2
(45) Date of Patent: Dec. 2, 2014

(54) INFLATABLE DEVICE FOR BLOCKING CHIMNEY FLUES OR OTHER DUCTS

(71) Applicant: Chimsoc Limited, High Wycombe, Buckinghamshire (GB)

(72) Inventor: Paul John Willis, Beaconsfield (GB)

(73) Assignee: Chimsoc Limited, High Wycombe, Buckinghamshire (GB)

( * ) Notice: Subject to any disclaimer, the term of this patent is extended or adjusted under 35 U.S.C. 154(b) by 0 days.

(21) Appl. No.: 13/719,333

(22) Filed: Dec. 19, 2012

(65) Prior Publication Data

US 2013/0160885 A1    Jun. 27, 2013

(30) Foreign Application Priority Data

Dec. 24, 2011  (GB) .................................. 1122339.3

(51) Int. Cl.
  *F16L 55/11* (2006.01)
  *F16L 55/134* (2006.01)
  *E04F 17/02* (2006.01)

(52) U.S. Cl.
  CPC ............. *F16L 55/1141* (2013.01); *E04F 17/02* (2013.01); *F16L 55/134* (2013.01)
  USPC .......................................................... 138/93

(58) Field of Classification Search
  USPC .......................................................... 138/93
  See application file for complete search history.

(56) References Cited

U.S. PATENT DOCUMENTS

| | | | | |
|---|---|---|---|---|
| 614,749 A | * | 11/1898 | Pallas ............................. | 138/93 |
| 1,506,418 A | * | 8/1924 | Evensta et al. .................. | 138/90 |
| 1,893,979 A | * | 1/1933 | Barrere ...................... | 134/166 C |
| 1,906,151 A | * | 4/1933 | Goodman et al. ............... | 138/93 |
| 3,276,481 A | * | 10/1966 | McNulty .......................... | 138/93 |
| 3,414,140 A | * | 12/1968 | Feldkamp ...................... | 206/522 |
| 3,564,103 A | * | 2/1971 | Brachschob et al. ........... | 373/82 |
| 4,458,721 A | * | 7/1984 | Yie et al. ......................... | 138/93 |
| 4,550,751 A | * | 11/1985 | Shimamura et al. ............ | 138/93 |
| 4,609,042 A | * | 9/1986 | Broadus et al. ................ | 166/187 |
| 4,674,570 A | * | 6/1987 | Jackson ........................ | 166/187 |
| 5,240,031 A | * | 8/1993 | Vigil ........................ | 137/315.01 |
| 5,503,188 A | * | 4/1996 | Petrone .......................... | 138/93 |
| 5,643,386 A | * | 7/1997 | Mathison et al. ............. | 156/218 |
| 5,785,090 A | * | 7/1998 | VanderLans .................... | 138/89 |
| 6,899,138 B2 | * | 5/2005 | Lundman ........................ | 138/93 |

FOREIGN PATENT DOCUMENTS

GB       2 251 929 A       7/1992

\* cited by examiner

*Primary Examiner* — James Hook
(74) *Attorney, Agent, or Firm* — Davis & Bujold, PLLC; Michael J. Bujold

(57) ABSTRACT

An inflatable device for blocking a chimney flue or other duct is in the form of a plastics bag 1 having an inflation tube 2 that opens through the wall of the bag 1 into a flexible, tubular sleeve 4 that is sealed circumferentially to the bag-wall at each of its opposite ends 5,6 within the bag 1. The sleeve 4 is vented into the bag 1 via diametrically-opposed apertures 7 mid-way between its ends 5,6 so that on inflation of the bag 1 the sleeve 4 limits distention of the bag 1 longitudinally of the sleeve 4 to a flatish form. The bag 1 is constructed of two plastics sheets 8,9 that are sealed together in a peripheral rim 10 with the two ends 5,6 of the sleeve 4 sealed centrally to the two sheets 8,9 respectively, and with an open end of the inflation tube 2 sealed through the bag-wall centrally within one end 5 of the sleeve 4. The rim 10 of the bag 1 is bowed inwardly to allow for limited ventilation of the otherwise-blocked chimney flue or duct.

14 Claims, 4 Drawing Sheets

INFLATABLE DEVICE FOR BLOCKING CHIMNEY FLUES OR OTHER DUCTS

This application claims priority from British patent application serial no. 1122339.3 filed Dec. 24, 2011.

FIELD OF THE INVENTION

This invention relates to inflatable devices of a kind for blocking chimney flues or other ducts.

BACKGROUND OF THE INVENTION

An inflatable device of the above kind is known from GB-A-2251929 in the form of a plastics bag that is inflated via a tube that opens into the bag via a seal in the wall of the bag. An elastic strip which is secured within the bag with one of its ends in the mouth of the inflation tube and the other end attached to the wall of the bag opposite the tube-mouth, stretches during inflation to provide positive pressure within the bag for maintaining the bag pressing against the inside surface of the chimney flue or other duct.

Manufacture of the inflatable device of GB-A-2251929 requires the secure attachment of the elastic strip in the mouth of the tube and to the inside wall of the bag opposite. This, together with the sealing of the tube through the wall of the bag, has been found difficult to accomplish reliably and economically in assembly of the device. It is one of the objects of the present invention to provide a form of inflatable device for blocking a chimney flue or other duct, by which this difficulty can be overcome

SUMMARY OF THE INVENTION

According to the present invention there is provided an inflatable device in the form of a plastics bag having an inflation tube for use in inflating the bag to block a chimney flue or other duct, wherein the inflation tube opens through the wall of the bag into a tubular member of flexible plastics material within the bag, and wherein the tubular member is vented into the bag and is sealed at each of its ends to the wall of the bag so as to limit distension of the inflated bag longitudinally of the tubular member.

Although reference is made herein to the blocking of a chimney flue or other duct, it is common at least where a chimney flue is involved, to allow a small degree of ventilation past the blockage, and accordingly the reference to blocking herein is to be understood in the sense that the blocking provided is not necessarily total.

The sealing of each end of the tubular member to the wall of the bag of the present invention, may be by means of a seal that extends circumferentially of the tubular wall of the tubular member. In these circumstances, the inflation tube may open through the wall of the bag centrally of the circumferential seal at one end of the tubular member.

The tubular member may be vented into the inflatable bag via one or more apertures in the tubular member that are located spaced from the wall of the bag. More especially, the venting of the tubular member into the inflatable bag may be via two diametrically-opposed apertures located in the tubular member mid-way between its two ends.

The inflation tube and the tubular member may be of the same plastics material as the bag, for example polyvinyl chloride (PVC).

BRIEF DESCRIPTION OF THE DRAWINGS

An inflatable device according to the present invention will now be described, by way of example, with reference to the accompanying drawings, in which.

DETAILED DESCRIPTION OF THE PREFERRED EMBODIMENTS

Figure 1:
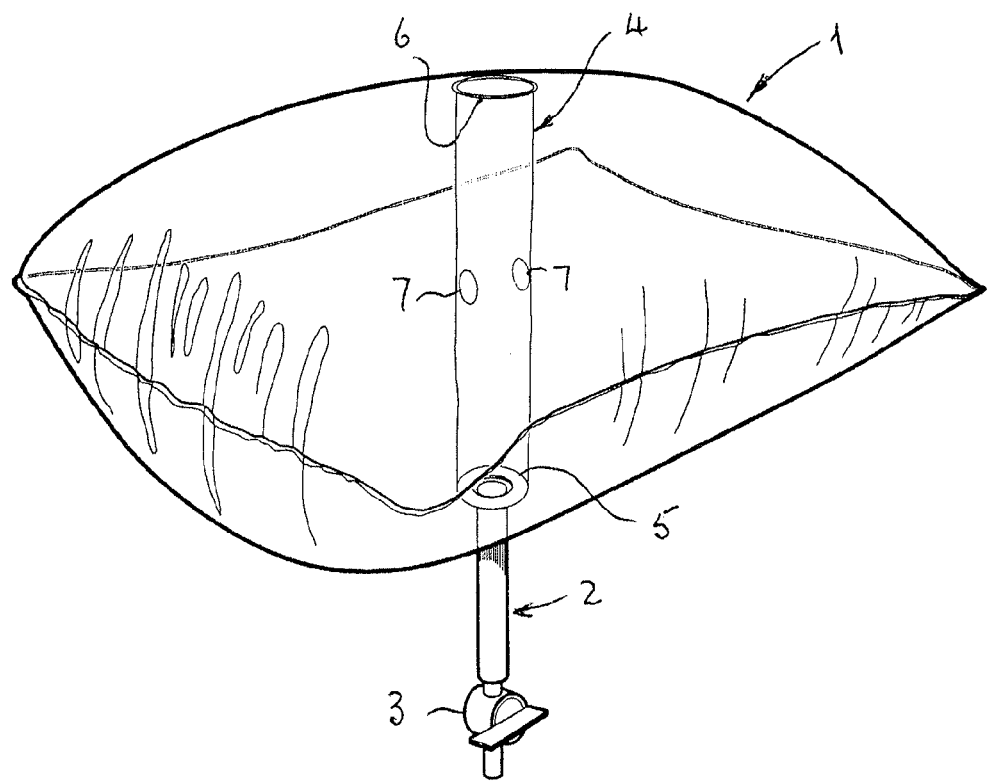
FIG. 1 is a perspective view of the inflatable device according to the invention, when inflated.
Figure 2:
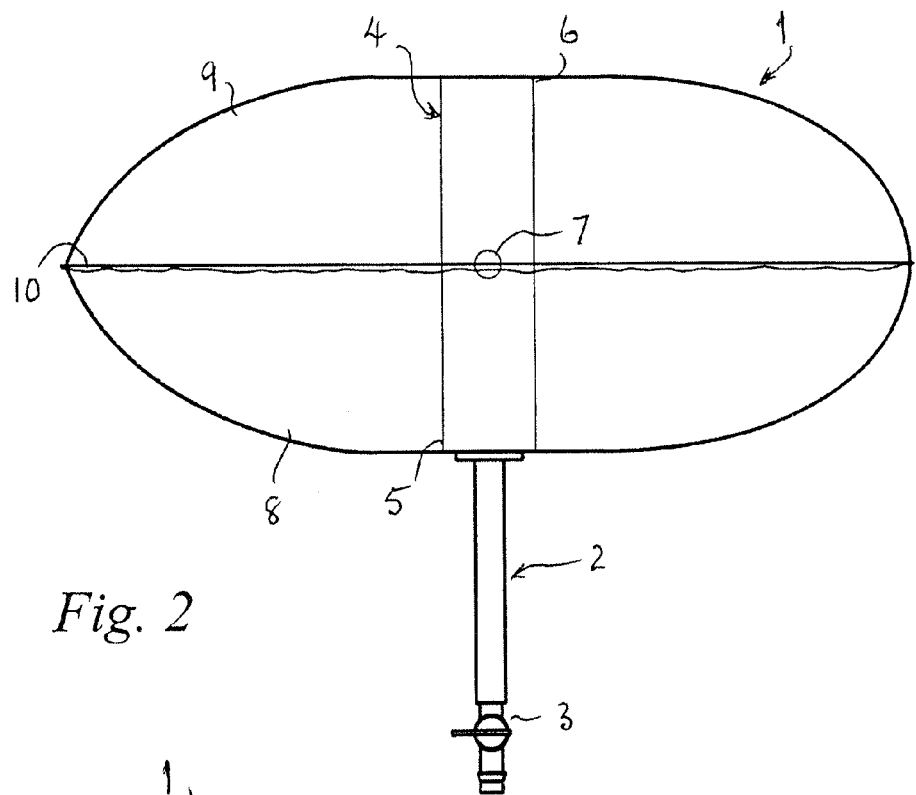
FIGS. 2 and 3 are respectively a side elevation and a plan view from below of the inflated inflatable device of FIG. 1.

Referring to FIGS. 1 to 4, the inflatable device in this example is in the form of a transparent plastics bag 1 that is inflated with air via a substantially-rigid plastics tube 2. A tap 3 incorporated in the tube 2 is turned to a CLOSED position (as shown) for retention of air in the bag 1, and turned through 90 degrees to an OPEN position during its inflation and for its deflation.

The tube 2 opens through the wall of the bag 1 into a tubular member or sleeve 4 of flexible plastics material within the bag 1. The sleeve 4 is sealed circumferentially to the wall of the bag 1 at each of its ends 5 and 6 within the bag 1, and is vented to the interior of the bag 1 via two diametrically-opposed apertures 7 mid-way between the ends 5 and 6.

The sleeve 4 is of a plastics material, for example polyvinyl chloride (PVC) having a thickness of 0.2 mm, which has little or no significant elasticity, so in the inflated bag 1 limits distension of the bag 1 longitudinally of the sleeve 4. This serves to constrain the shape of the inflated bag 1 to be of a flatish form in height (longitudinally of the sleeve 4) without imposing material constraint laterally of this.

The bag 1 is constructed of two near-rectangular sheets 8 and 9 of plastics material, for example, of the same plastics material as the sleeve 4, namely polyvinyl chloride (PVC) having a thickness of 0.2 mm. The two sheets 8 and 9 are sealed together in a peripheral rim 10 to provide the enclosing wall of the bag 1, following sealing of the inflation tube 2 and the end 5 of the sleeve 4 to the sheet 8, and of the end 6 to the sheet 9. All such seals can be provided with economy and a high degree of integrity where the sleeve 4 and the sheets 8 and 9, and the inflation tube 2 also, are all of the same basic plastics material, for example polyvinyl chloride (PVC).

Figure 4:
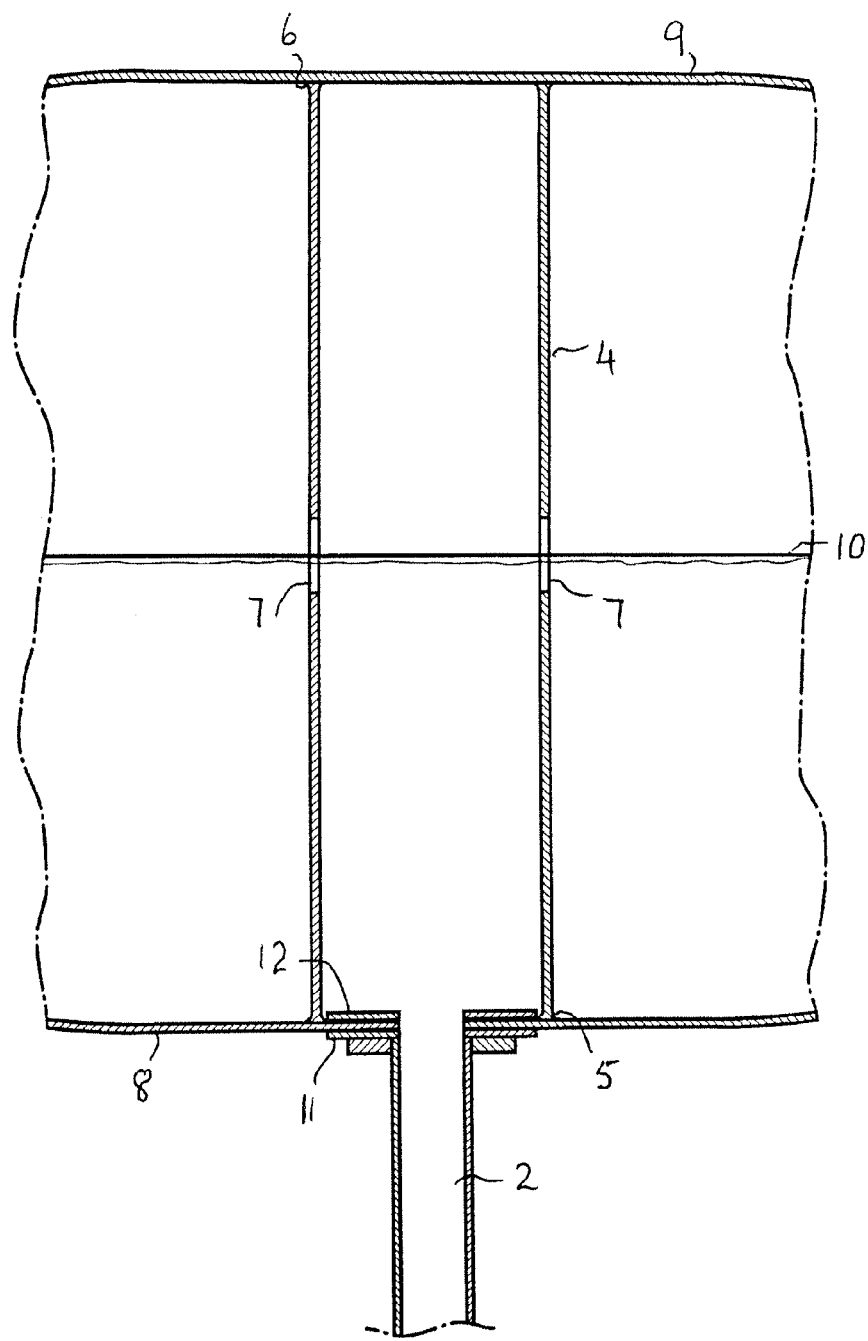
FIG. 4 is a sectional side elevation to an enlarged scale of a central region of the inflated inflatable device of FIG. 1.

Referring now more-particularly to FIG. 4, the ends 5 and 6 of the sleeve 4 are sealed circumferentially to the centres of the sheets 8 and 9 respectively, and the seal with which the tube 2 opens into the sleeve 4 through the sheet 8 is located centrally spaced inwardly within the end 5. The latter seal is formed by the bonding to the open end of the tube 2 of moulded discs 11 and 12 of plastics that are bonded to the sheet 8 clamped tightly to the inside and outside respectively of the sheet 8. The spacing apart of the seals of the tube 2 and the end 5 of the sleeve 4 facilitates economy and reliability in the manufacture of the inflatable device in that they are independent of one another and require minor manual involvement in assembly of the inflatable device.

Figure 5:
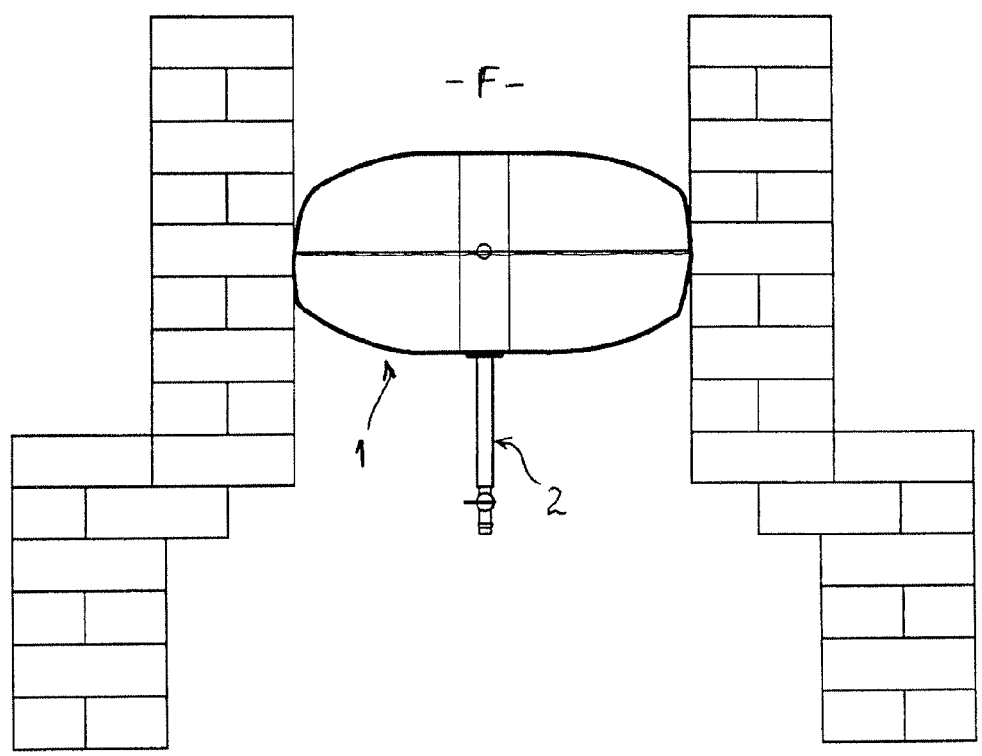
FIG. 5 is illustrative of the inflated inflatable device when used to block a chimney flue or other duct.

When the device described above is in its deflated condition with the sleeve 4 collapsed, it is readily foldable into a compact package for storage, and can be quickly deployed for blocking a chimney flue or other duct. In this regard, the device while in a deflated or partly-inflated condition, is entered into a location within the chimney flue or other duct where blocking is required, and is then inflated with air from the user's mouth or by using a suitable hand- or foot-pump attached to the inflation tube 2. Once inflated, the bag 1 is retained by the air pressure as illustrated in FIG. 5, in abutment with the surrounding wall of the flue F or other duct. The limit on distention of the bag 1 in the height dimension longitudinally of the sleeve 4, and the resulting flatish blocking configuration, act to enhance the pressure of the bag 1 against the surrounding wall of the flue F or other duct, and thereby the blocking efficiency of the device.

Figure 3:
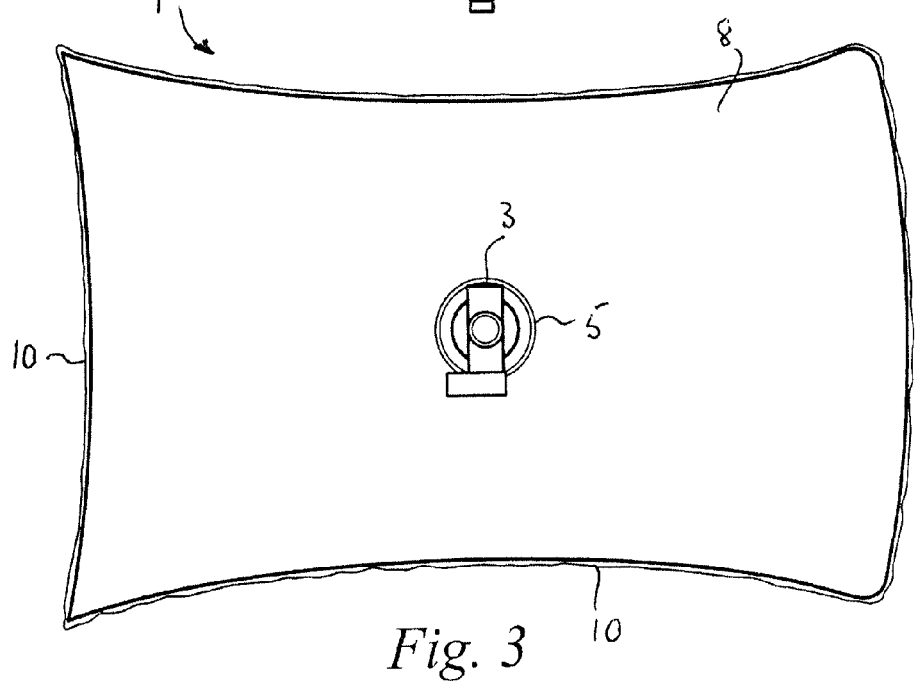

As shown by FIG. 3, the rim 10 of the bag 1 of the present example has a configuration in plan that is bowed inwardly on three sides of the inflated device. The inward bowing allows for a small degree of ventilation which, as distinct from complete or total blocking, is desirable in the case of a chimney flue. In circumstances where there is to be total blocking of the flue or duct, the inward bowing is omitted.

Although a generally-rectangular configuration of inflated device is described above, the configuration may be different from this, and may be for example circular or otherwise best suited to the chimney flue or other duct to be blocked.

The invention claimed is:

1. An inflatable device for blocking a duct, the inflatable device comprising:
   (a) an inflatable plastics bag,
   (b) an inflation tube for inflating the bag to block the duct, and
   (c) a tubular member of flexible plastics material within the bag, the tubular member having opposite ends sealed to respective spaced-apart portions of a wall of the bag to limit distention of the bag longitudinally of the tubular member when the bag is inflated,
   wherein the inflation tube opens through the wall of the bag into the tubular member, and the tubular member is vented into the bag.

2. The inflatable device according to claim 1, wherein each of the opposite ends of the tubular member is sealed to the wall of the bag by an individual seal which seals the tubular member to the wall circumferentially of the tubular member at the respective end.

3. The inflatable device according to claim 2, wherein the inflation tube opens through the wall of the bag into one of the opposite ends of the tubular member, the inflation tube opening into the tubular member centrally of the seal which seals the tubular member to the wall circumferentially at said one end of the tubular member.

4. The inflatable device according to claim 1, wherein the tubular member is vented into the inflatable bag via an aperture in the tubular member spaced from the wall of the bag.

5. The inflatable device according to claim 1, wherein the tubular member is vented into the inflatable bag via diametrically-opposed apertures in the tubular member, the diametrically-opposed apertures being spaced between the opposite ends of the tubular member.

6. The inflatable device according to claim 1, wherein the tubular member is a sleeve of the same plastics material as the bag.

7. The inflatable device according to claim 1, wherein the inflation tube is of the same plastics material as the bag.

8. The inflatable device according to claim 1, wherein the inflatable bag is of polyvinyl chloride (PVC) material.

9. The inflatable device according to claim 1, wherein the bag comprises two sheets of flexible plastics material that are sealed together peripherally.

10. The inflatable device according to claim 9, wherein the bag has a periphery, and at least part of the periphery of the bag is bowed inwardly.

11. An inflatable device for blocking a chimney flue, the inflatable device comprising:
    (a) an inflatable plastics bag comprising first and second sheets of flexible plastics material that are sealed together peripherally;
    (b) an inflation tube for inflating the bag to block the chimney flue, and
    (c) a tubular sleeve of flexible plastics material so that the sleeve can collapse and be foldable into a compact package for storage, the tubular sleeve having first and second ends that are sealed to the first and second sheets respectively within the bag to limit distention of the bag longitudinally of the tubular sleeve when the bag is inflated,
    wherein the inflation tube extends through the first sheet to open into the tubular sleeve centrally of the first end of the tubular sleeve within the bag, and the tubular sleeve is vented into the inflatable bag through at least one aperture in the tubular sleeve spaced from the first and second ends of the tubular sleeve.

12. The inflatable device according to claim 11, wherein the tubular sleeve is vented into the inflatable bag via diametrically-opposed apertures in the tubular sleeve spaced between the first and second ends of the tubular sleeve.

13. The inflatable device according to claim 11, wherein the two sheets and the tubular sleeve are of polyvinyl chloride (PVC) material.

14. The inflatable device according to claim 11, wherein the inflation tube incorporates a tap that is operable selectively between CLOSED and OPEN conditions to close and open respectively the inflation tube.

* * * * *